No. 706,297. Patented Aug. 5, 1902.
J. DE BRUYN.
APPARATUS FOR COMPARING HANDWRITINGS OR OTHER OBJECTS.
(Application filed Feb. 12, 1902.)
(No Model.)
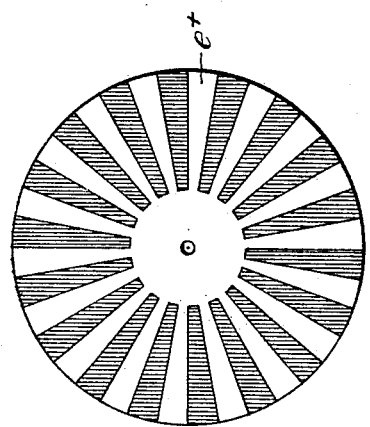
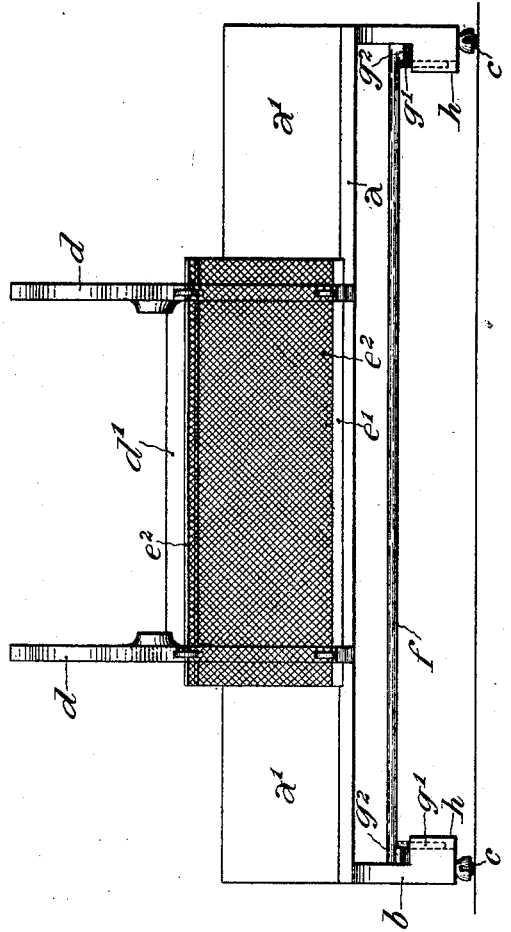
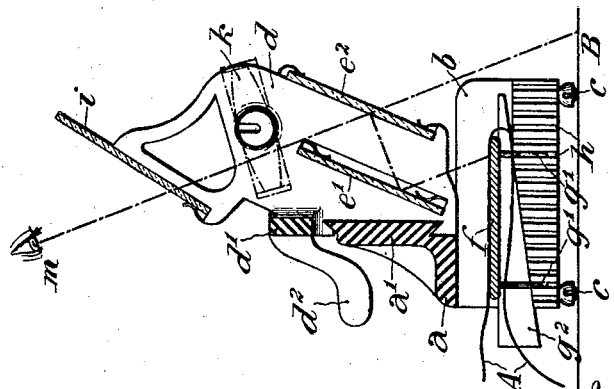

UNITED STATES PATENT OFFICE.

JACOBUS DE BRUYN, (MARTINUS GERARDUS ZOON,) OF LAUSANNE, SWITZERLAND.

APPARATUS FOR COMPARING HANDWRITINGS OR OTHER OBJECTS.

SPECIFICATION forming part of Letters Patent No. 706,297, dated August 5, 1902.

Application filed February 12, 1902. Serial No. 93,731. (No model.)

*To all whom it may concern:*

Be it known that I, JACOBUS DE BRUYN, (MARTINUS GERARDUS ZOON,) of Lausanne, Switzerland, notary, have invented certain new and useful Improvements in Apparatus for Comparing Handwritings or other Objects, of which the following is a specification.

This invention relates to apparatus adapted for the comparison of various objects, especially handwritings, or the comparison of two signatures to determine whether or not they were written by the same person. The said instrument may also be used for comparing samples of paper, fabric, photographs, or anything desired. In this instrument, which is of very simple construction, one of the objects to be compared is reflected in a mirror, the reflecting material of which is partially removed or may be of a transparent nature, so as to allow the eye which is observing the object reflected in said mirror to also see through the mirror to observe the other object to be compared.

In the accompanying drawings, which show one form of construction of the instrument, Figure 1 is a front view of said instrument. Fig. 2 is a central transverse section of the same, showing the mirror $i$ in place. Fig. 3 shows a modified form of mirror.

The frame of the instrument consists of a carriage which is formed by a bar $a$, fixed to two brackets $b$, provided with rollers or balls $c$, by means of which the instrument may be easily moved over a letter-copy book or the like bearing, for instance, one of the signatures to be compared. The bar $a$ is provided with a longitudinal projection $a'$ of a dovetailed section, upon which the second sliding frame is moved, said sliding frame being formed of two brackets $d\ d$ and of a cross-bar $d'$, provided with a handle $d^2$. The said second sliding frame carries a mirror $e'$ of usual kind and a second mirror $e^2$, having the reflecting material partially taken off, as shown in Fig. 1. The brackets $b\ b$ carry a platform $f$, adapted to hold one of the papers A bearing the signature to be compared. The platform $f$ is provided with pins $g'\ g'$, engaging with slots $h$ in the brackets $b\ b$, whereby said platform may be moved to and fro on the instrument. Wedges $g^2\ g^2$ are interposed between the brackets $b\ b$ and the platform $f$, so as to make adjustable the exact height of said platform above the paper B, bearing the second signature, with which the signature drawn upon A is to be compared. $k$ is a magnifying-glass (shown in dotted lines) which may be fixed to swing between parts of the instrument just described for particularly delicate inspections.

$i$ illustrates an additional mirror (see Fig. 2) which may be fixed to the instrument in order to reflect directly the two superposed signatures which the eye $m$ has observed or in order to reflect them against a screen by means of a suitable projecting apparatus.

The operation of my improved device is as follows: The written sheet A, bearing one handwriting, being fixed to the platform $f$ and the instrument placed upon the sheet B, bearing the second handwriting to be compared with the first one, the said platform $f$ is first adjusted on the brackets $b$ and the sliding frame $d\ d$ on the sliding bar $a$, so that the eye $m$ may see in the mirror $e^2$ the first handwriting to be compared, which is reflected by the mirror $e'$ upon the said mirror $e^2$. Then the said instrument is placed upon the paper B, bearing the second handwriting, so as to superpose the writing reflected in the mirror $e^2$ upon the corresponding visible portion of the sheet B, as seen through the mirror $e^2$ in an effort to superpose the two handwritings.

The mirror $e^2$ may be replaced by a disk $e^x$, formed of a mirror, the reflecting material of which is removed in radial stripes, as shown in Fig. 3, suitable means being provided for securing the said mirror $e^2$ to the frame and also for revolving the same. The said mirror $e^2$ may be provided with a reflecting material of transparent nature, as is, for instance, the case with the well-known platinum-plated glass, which works both as a mirror and as a transparent glass.

The apparatus may be combined with any suitable means for lighting the two objects to be compared—for instance, with suitably-adjustable reflectors.

I claim as my invention—

1. In an instrument for comparing handwritings and other objects, the combination with a base and a frame, of a mirror secured in said frame, a mirror, in part reflecting and in part transparent, also secured in said frame, means in connection with said base for holding one of the objects to be compared, means for adjusting the position of the aforesaid means in the base, and means for reflecting the compared objects upon a screen, substantially as set forth.

2. In an instrument for comparing handwritings and other objects, the combination with the base $b$ and frame $d$, of a mirror $e'$ secured in said frame, a mirror $e^3$ in part reflecting and in part transparent, also secured in said frame and parallel to the aforesaid mirror and at a slightly-higher elevation, the platform $f$ for holding one of the objects to be compared, and wedges $g^2$ placed between the said base and platform $f$ for adjusting the height of the platform $f$ and object thereon in relation to the bottom of the base under which the second object is placed, substantially as specified.

3. In an instrument for comparing handwritings and other objects, the combination with the base $b$ and frame $d$, of a mirror $e'$ secured in said frame, a mirror $e^2$, in part reflecting and in part transparent, also secured in said frame and parallel to the aforesaid mirror and at a slightly-higher elevation, a platform $f$ for holding one of the objects to be compared, wedges $g^2$ between the said base and platform $f$ for adjusting the height of the platform $f$ and object thereon in relation to the bottom of the base under which the second object is placed, and a detachable mirror $i$ to be placed in the upper part of said frame for reflecting the comparison of the objects upon a screen, substantially as specified.

4. In an instrument for comparing handwritings and other objects, the combination with a suitable framework-support, of an adjustable platform in a plane parallel to the surface carrying the support, a mirror carried by the support above the platform and a device in part reflecting and in part transparent set in a plane parallel to the mirror and carried by the support at a slightly-higher elevation than the mirror, substantially as and for the purposes set forth.

In testimony that I claim the foregoing as my invention I have signed my name in presence of two subscribing witnesses.

JACOBUS DE BRUYN, (MARTINUS GERARDUS ZOON.)

Witnesses:
E. IMER-SCHNEIDER,
L. H. MUNIER.